March 16, 1937. J. H. VICTOR ET AL 2,073,768
GREASE RETAINER WITH REENFORCED DIAPHRAGM
Original Filed Jan. 27, 1933
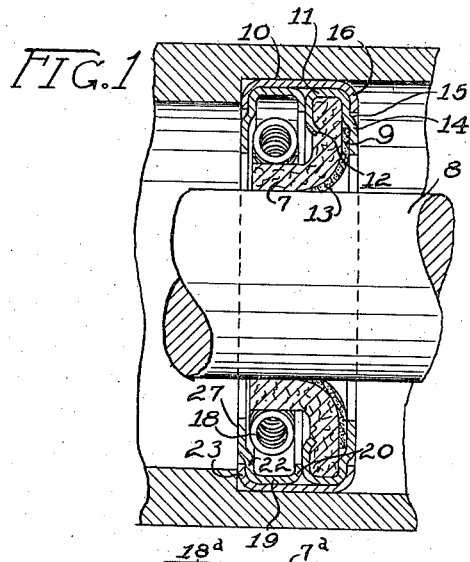
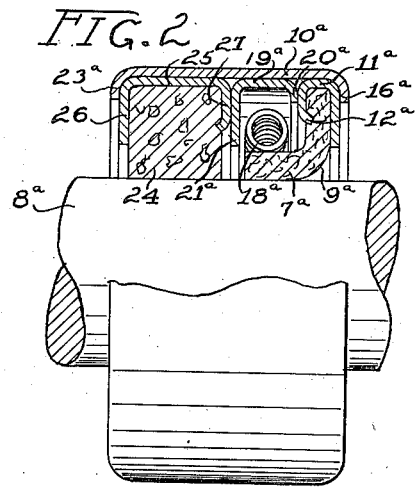
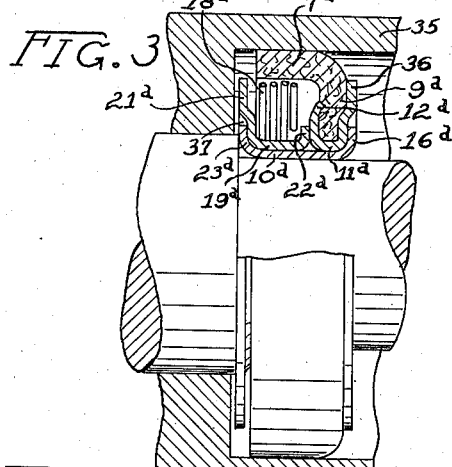
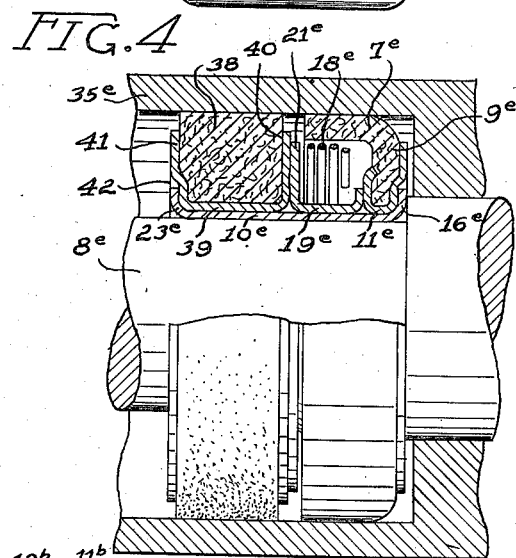
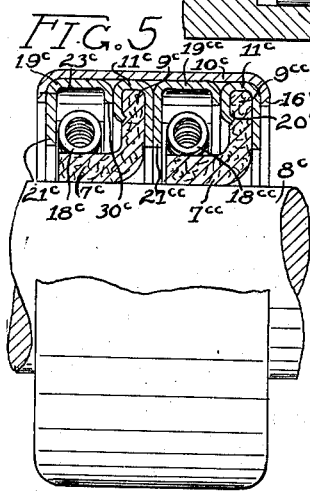
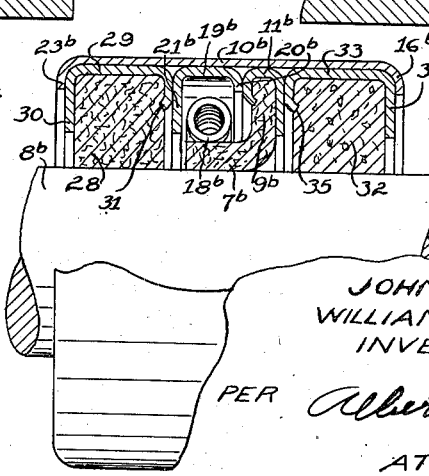
JOHN H. VICTOR
WILLIAM A. HEINZE
INVENTORS
PER
ATTORNEY Patented Mar. 16, 1937

2,073,768

UNITED STATES PATENT OFFICE 2,073,768

GREASE RETAINER WITH REENFORCED DIAPHRAGM

John H. Victor, Wilmette, and William A. Heinze, Chicago, Ill., assignors to Victor Manufacturing & Gasket Company, Chicago, Ill., a corporation of Illinois Original application January 27, 1933, Serial No. 653,820. Divided and this application August 26, 1935, Serial No. 37,824

2 Claims. (Cl. 288—1)

This invention relates to an improved grease retainer with reenforced diaphragm, and this application constitutes a division of an application for patent on "Grease retainers" by these same inventors filed January 27, 1933, Serial No. 653,820. A particular use of the invention is to form a seal about the rear axle of an automobile but it may be used in other installations without departing from the purview of the invention.

One object of the invention is to provide a novel grease retainer which is effectively reenforced so as to prevent distortion thereof during installation and use.

Other objects are to provide a grease retainer embodying a part held in constricted relation about a shaft and to so arrange this part that it may be used alone or in combination with other packing, and an ancillary object is to retain this part and the other packing with it which may be used in a unit assembly.

A further object is to provide a grease retainer having a member including an armored part providing an oil seal and a flexible part which may be held in yieldable engagement with a device to provide a seal and wherein said member and device are adapted for relative movement.

Selected embodiments of the invention are illustrated in the accompanying drawing wherein Fig. 1 is a sectional view showing one form of our grease retainer applied to a section of a shaft and mounted in a housing;

Fig. 2 is an elevational view showing a modified form of our novel retainer applied to a shaft section and in which a portion of the retainer is broken away;

Fig. 3 is a view similar to Fig. 1 showing another modified form of the invention;

Fig. 4 is a sectional view showing a further modified form of the invention applied to a shaft section and mounted in a housing; and Figs. 5 and 6 are elevational views in which portions of the grease retainers are broken away and which show further modified forms of the invention.

Referring to the drawing and more particularly to Fig. 1, the packing comprises a ring made of leather or other suitable material having a tubular portion 7 to engage the periphery of a shaft 8 and a radial portion 9 securely held against rotation in the shell 10. The peripheral edge of the radial portion of the packing is armored with a binding 11 which is preferably made of metal in the form of a ring having an annular groove opening inwardly to receive the peripheral edge of the packing. The armor binding is pressed upon the packing to hold it snugly and tightly to prevent the passage of grease or oil between the edge of the packing and the binding and also to prevent the packing from moving rotatively in the binding. One edge 12 of the binding is bent inwardly into the packing to rigidly secure the binding on the packing. A reenforcing ring or washer 13 is secured against the outer side of the radial portion 12 of the packing and extends over that portion of the packing where the radial portion merges with the tubular portion. The side of the armor binding is offset as at 14 to secure the washer reenforce to the packing. Moreover, the offset portion 14 provides a shoulder 15 in the armor binding against which a flange 16 on the shell 10 is abutted. When the armor binding 11 is forced into the shell to be seated therein adjacent one end thereof, a coil spring 18 is arranged about the tubular portion 7 of the packing to hold the tubular portion of the packing in snug engagement with the periphery of the shaft to prevent passage of grease or oil. A reenforcing ring 19 is provided which has an inturned flange 20 at the inner end thereof that engages the inwardly disposed face of the armor binding 11. The ring 19 also includes a side 21 which encloses one end of the shell 10 and which retains the spring 18 in the shell. A shoulder 22 is formed in the side 21 at the juncture thereof with the periphery of the ring 19 and a flange 23 on the shell 10 is engaged with this shoulder. Thus the flanges 16 and 23 on the shell serve to effectively clamp the armor binding 11 and the ring 18 in the shell.

The armor binding 11 is pressed into the shell 10 with sufficient force to insure a tight fit between the binding and the shell to thereby prevent rotation of the binding and the packing relative to the shell. The ring 19 effectively reenforces the shell so that it will not be distorted when a tubular member is engaged therewith to drive the retainer into the housing in which it is mounted.

In the form of the invention shown in Fig. 2, a packing comprising a ring made of leather or other suitable material has a tubular portion 7a to engage the periphery of a shaft 8a and a radial portion 9a securely held against rotation in the shell 10a. The peripheral edge of the radial portion of the packing is armored with a binding 11a similar to the binding 11 and including an edge 12a bent inwardly into the packing to rigidly secure the binding on the packing. Another packing such as a ring 24 of cork or other suitable innately resilient material has a binding 25 on the periphery thereof which includes side walls 26 and 27 and the inner edge of the side wall 27 is bent into the ring to rigidly fasten the binding on the ring. The ring 24 is mounted in the shell 10a at the end thereof opposite the end at which the armor binding 11a on the flanged packing is mounted.

A reenforcing ring 19a is interposed between the bindings 11a and 25 and includes an inturned flange 20a which engages the inwardly disposed face of the armor binding 11a. The ring 19a also includes a side 21a which engages the inwardly disposed side wall 27 of the binding 25 and which also retains the coil spring 18a in position to constrict the tubular portion 7a of the flanged packing into tight leak-proof engagement with the periphery of the shaft 8a. A flange 16a at one end of the shell 10a engages the armor binding 11a and a flange 23a at the other end of the shell engages the outwardly disposed side wall 26 of the binding 25. Thus the shell 10a holds the flanged packing, the innately resilient packing, and the reenforcing ring in assembled relation in a unit structure.

In Fig. 6 a further modified form of the invention is shown and herein a packing comprising a ring made of leather or other suitable material has a tubular portion 7b to engage the periphery of a shaft 8b and a radial portion 9b securely held against rotation in the shell 10b. The peripheral edge of the radial portion 9b of the packing is armored with a binding 11b similar to the binding 11a and connected to the packing in the same manner as the binding 11a is connected to the radial portion 9a. A reenforcing ring 19b includes an inturned flange 20b and a side 21b which retains the coil spring 18b in constricting position about the tubular portion 7b to urge the same into tight engagement with the shaft 18b. Suitable packing is positioned on each side of the flanged packing and the reenforcing ring 19b and in the present instance a ring of felt 28 is provided which has a binding 29 thereon including side walls 30 and 31, the free edge of the wall 31 being bent into the packing ring 28 to secure the binding 29 thereon. The wall 31 is engaged by the side 21b of the ring 19b.

The packing on the opposite side of the reenforcing ring 19b and flanged packing consists of a ring 32 of cork or suitable material having a binding 33 thereon which includes a side wall 34 and a side wall 35. The free edge of the side wall 35 is bent into the ring 32 to secure the binding on the ring. The wall 35 is engaged with the side wall of the binding 11b. A flange 16b at one end of the shell 10b engages the wall 34 and a flange 23b at the other end of the shell engages the wall 30. The binding 11b is pressed into the shell 10b to be held against rotation therein and the flanges at the ends of the shell force the bindings 29 and 33 and the ring 19b inwardly and securely lock the packings in assembled relation in a unit structure.

A still further modified form of the invention is illustrated in Fig. 5 and herein two packings are provided comprising rings made of leather or other suitable material and having tubular portion 7c and 7cc to engage the periphery of the shaft 8c and radial portions 9c and 9cc securely held against rotation in the shell 10c. The peripheral edge of the radial portion 9c is armored with a binding 11c substantially similar to the binding 11a. The periphery of the radial portion 9cc is armored with a binding 11cc which is also substantially similar to the binding 11a. A reenforcing ring 19cc includes an inturned flange 20cc which engages the binding 11c that is arranged at one end of the shell 10c. The ring 19cc also includes a side 21cc which is engaged with a side of the binding 11c. Another reenforcing ring 19c is provided at the end of the housing opposite the binding 9cc and includes an inturned flange 20c which engages the side of the binding 11c opposite that engaged by the side 21cc. The ring 19c also includes a side 21c which encloses one end of the shell and retains a spring 18c in constricting relation about the tubular portion 11c. The side 21cc retains a coil spring 18cc in constricting relation about the tubular portion 7cc. A flange 16c is provided at one end of the shell 10c and a flange 23c is provided at the other end of the shell. The bindings 11c and 11cc are pressed into the shell 10c and these bindings and the reenforcing rings 19c and 19cc are held in assembled relation in a unit structure.

In the forms of the invention shown in Figs. 1, 2, 5 and 6 the tubular portions of the packings are constricted onto the shafts by coil springs. In Figs. 3 and 4 modified forms of the invention are illustrated and herein the tubular portions of the packing are urged into leak-proof engagement with the wall of the housing surrounding the shaft.

In Fig. 3, the shaft 8d is journaled in a housing 35 and in this instance a shell 10d is provided which is secured on the periphery of the shaft 8d. The packing includes a tubular portion 7d and a radial portion 9d. The peripheral edge of the radial portion of the packing is armored with a binding 11d which is preferably made of metal in the form of a ring having an annular groove opening outwardly to receive the peripheral edge of the packing. The armor binding is pressed upon the packing to hold it snugly and tightly and to prevent the passage of grease and oil between the edge of the packing and the binding and also to prevent the packing from moving rotatively in the binding. One edge 12d of the binding is bent inwardly into the packing to rigidly secure the binding on the packing. In this form of the invention, the peripheral portion of the binding is narrower than the inwardly disposed part thereof and this is accomplished by offsetting the free edge of the side wall 36 of the binding, and this offset is sufficient so that when the flange 16d on the shell 10d is clamped over into engagement with the binding 11d this flange and the offset portion of the wall 36 are in substantial alignment. The binding 11d is pressed into the shell 10d to be held against rotative movement therein and is disposed at one end of the shell 10d. A reinforcing ring 19d includes an inturned flange 20d which engages one side of the binding 11d. The side 21d of the ring 19d is dished as at 37 so that when the flange 23d on the shell 10d is bent over into engagement with the dished portion of the side, this flange and the remaining portion of the side 21d are in substantial alignment. The side 21d holds the coil expansion spring 18d against displacement from the shell and the spring 18d acts on the tubular portion 7d to force the same into tight leak-proof engagement with the adjacent surface of the wall of the housing 35.

In Fig. 4 a modified form of the invention is shown which is an adaptation of the forms of the invention shown in Figs. 2 and 3; that is to say, the packing includes a tubular portion 7e which is forced into engagement with the adjacent wall of the housing 35e by a coil expansion spring 18e. The packing includes a radial portion 9e. The peripheral edge of the radial portion 9e is armored with a binding, 11e substantially similar to the binding 11d. A reenforcing ring 19e includes an inturned flange portion 20e which engages one side of the binding 11e and the binding 11e is positioned at one end of the shell 10e. The ring 19e includes a side 21e which retains the spring 18e in the shell. An innately resilient packing such as a felt ring 38 is provided which has a binding 39 thereon that includes a side 40 that is engaged with the side 21e. The binding 39 also includes a side 41 which is dished as at 42 adjacent the periphery of the ring 39 to receive the flange 23e on the shell 10e, the shell also having a flange 16e which engages the binding 11e. The bindings 11e and 39 are preferably pressed into the shell 10e and the shell 10e is secured on the periphery of the shaft 8e. The tubular portion 7e and the periphery of the packing ring 38 engage the adjacent wall of the housing 35e to provide a grease and oil tight seal.

It is manifest from the foregoing description that we have provided a grease retainer consisting of a packing embodying a tubular portion which when urged by a spring into engagement with an adjacent member provides an oil and grease seal. The peripheral edge of the radial portion of this packing is armored and is pressed into a shell and provides a grease and oil tight shell. The packing ring may be used in connection with innately resilient packing which may be disposed on one or both sides thereof and preferably the innately resilient packing is armored in the same manner as the radial portion of the packing ring and the armor binding on the innately resilient packing is also tightly engaged with the shell with which it is mounted. The flanges at the ends of the shell hold the packings in assembled relation within the shell and one or more reenforcing rings is interposed between the armor bindings on the packings and serve to prevent collapsing of the retainers particularly when they are being driven into position.

We have illustrated several different forms of the invention but it is to be understood that the invention can be embodied in other forms and while we have shown the innately resilient packing as being cork and felt and in each instance have illustrated one or the other of these materials it is to be understood that these materials might be interchanged or other materials might be substituted therefor, the choice of materials being dependent chiefly upon the usage to which the retainer is to be put. We have also illustrated certain details of construction but it is to be understood that the invention is susceptible of variation and modification and we therefore do not wish to be limited to the precise details set forth but desire to avail ourselves of such changes and modifications as fall within the ambit of the following claims.

We claim:

1. A grease retainer comprising a shell, a packing ring having a tubular portion to receive a shaft and a radially extending portion, an armor binding enclosing the marginal edge of the radial portion of the packing and engaging the shell at one end thereof, a reenforcing ring interposed between the other end of the shell and said armor binding, annular countersunk portions adjacent the outer rims of the armor binding and the reenforcing ring, and correspondingly inturned edges of the shell fitted into said countersunk portions.

2. A grease retainer comprising a shell, a packing ring having a tubular portion to receive a shaft and a radially extending portion secured in the shell adjacent one end thereof, a reenforcing member secured on the outer side of the packing in reenforcing relation to that part of the packing where the tubular portion and radial portion thereof merge, an armor binding on the radially extending portion of the packing, said binding fastening the reenforcing member in position, and a reenforcing ring interposed between the radial portion of the packing and the other end of the shell, the reenforcing ring being offset adjacent its periphery to receive the juxtaposed inturned edge of the shell and provide a smooth face for the retainer.

JOHN H. VICTOR.
WILLIAM A. HEINZE.